No. 703,588. Patented July 1, 1902.
J. C. IVEY, Sr.
VEGETABLE CUTTER.
(Application filed Jan. 16, 1902.)
(No Model.)
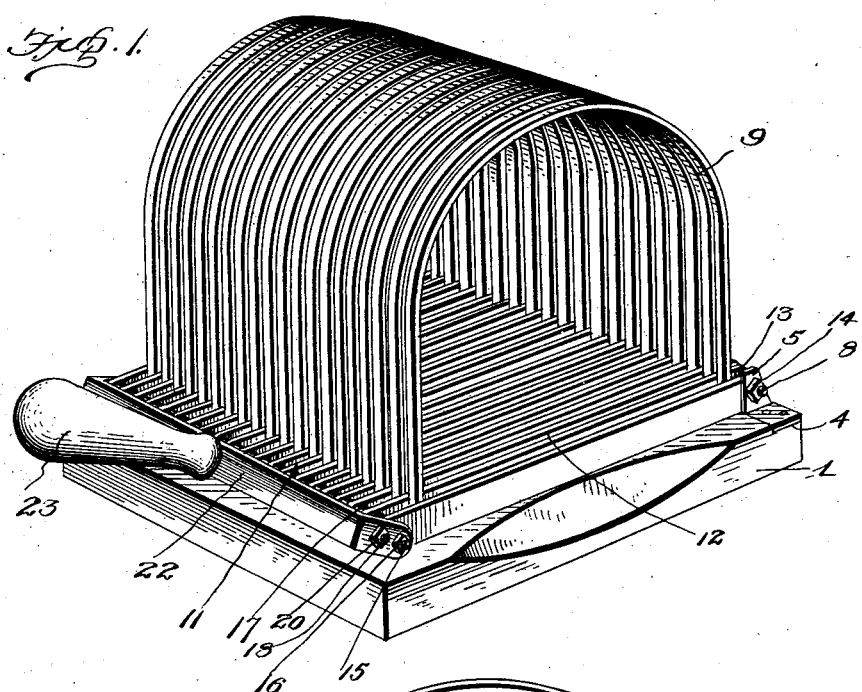
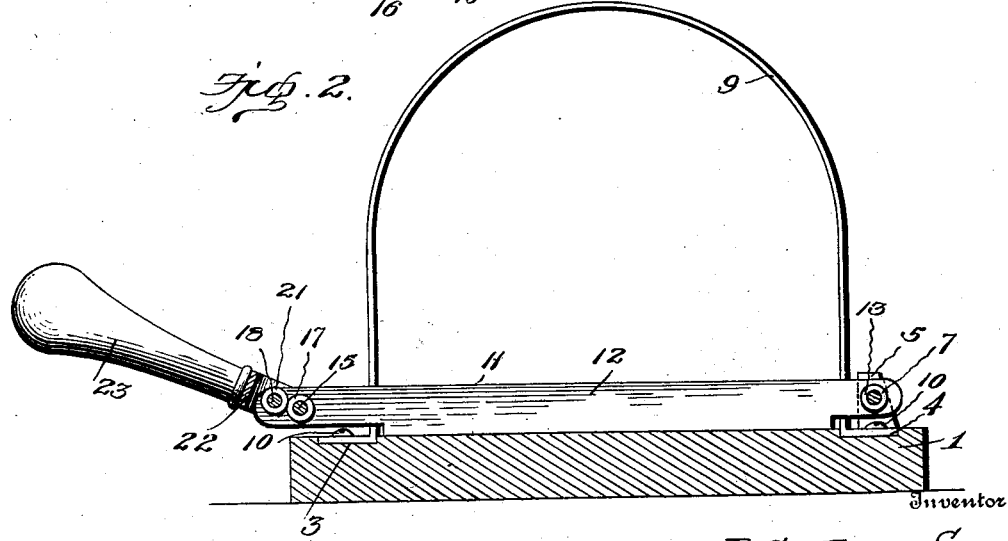
Witnesses
Inventor
J. C. Ivey, Sr.

UNITED STATES PATENT OFFICE.

JOEL C. IVEY, SR., OF AUGUSTA, GEORGIA, ASSIGNOR OF ONE-THIRD TO CURTIS IVEY, OF AUGUSTA, GEORGIA.

VEGETABLE-CUTTER.

SPECIFICATION forming part of Letters Patent No. 703,588, dated July 1, 1902.

Application filed January 16, 1902. Serial No. 90,037. (No model.)

*To all whom it may concern:*

Be it known that I, JOEL C. IVEY, Sr., a citizen of the United States, residing at Augusta, in the county of Richmond and State of Georgia, have invented certain new and useful Improvements in Vegetable-Cutters; and I do declare the following to be a full, clear, and exact description of the invention, such as will enable others skilled in the art to which it appertains to make and use the same.

The invention relates to vegetable-cutters.

The object of the invention is to provide a device of this character which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claim.

In the accompanying drawings, Figure 1 is a perspective view of my improved vegetable-cutter, and Fig. 2 is a longitudinal sectional view.

Referring to the drawings, 1 denotes the base or chopping-board, having grooves or recesses 3 and 4 formed in its face near its opposite ends.

5 denotes standards consisting of angle-plates, the lower ends of which are seated in the groove 4 and the upper ends of which support a shaft 7, having screw-threaded ends 8.

9 denotes a clearance-comb, which consists of spring-bars arranged in parallel order and of bow form. The ends of these bars are bent at right angles and are seated in the grooves or recesses 3 and 4 and are secured therein by screws 10.

11 denotes a slicer, which consists of a gang of parallel blades or knives 12, the rear ends of which are journaled upon the shaft 7 and are spaced apart by washers 13, nuts 14 being screwed upon the ends of the shaft for holding it in place. A shaft 15 extends through the forward ends of the blades and is provided with nuts 16 upon its ends, and placed between the blades or knives at the forward ends are spacing-washers 17.

18 denotes a shaft secured to the forward extremities of the blades by nuts 20 and provided with washers 21.

22 denotes a handle-bail, the ends of which are bent at right angles to the body portion and are provided with apertures through which the shafts 15 and 18 extend, so as to fixedly connect said bail with the slicer. A grasp or handle 23 is secured to the bail for reciprocating the slicer.

In operation the knives or blades are elevated and a vegetable placed upon the chopper-board beneath them. Now by drawing the knives downwardly the vegetable will be cut into uniform slices. An upward and rearward movement of the blades or knives will free said blades or knives of any vegetable slices which may tend to cling to the sides of the blades, as the comb-strips will scrape the sides of the blades.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a vegetable cutter or slicer, the combination with a base formed at its opposite ends with longitudinal parallel recesses, of a gang of bow-shaped comb-strips arranged in parallel order and having their lower ends extending horizontally and seating in said recesses and secured thereto, standards consisting of angle-plates, the lower ends of which are seated in the recesses at the rear end of the base, a shaft mounted in said standards, a gang of knives mounted upon said shafts, washers interposed in series between said knives, shafts extending through the forward ends of said knives, washers mounted on said shafts in series between said knives, a handle-bail connected to the outer ends of said shafts and projecting upwardly from the knives at an angle thereto, and a handle secured to said bail, substantially as set forth.

In testimony whereof I have hereunto set my hand in presence of subscribing witnesses.

J. C. IVEY, Sr.

Witnesses:
J. L. Rus Pring,
C. F. Nürnberger,
W. H. Nurnberger.